United States Patent
Strassner et al.

[11] Patent Number: 6,033,023
[45] Date of Patent: Mar. 7, 2000

[54] HEADREST

[76] Inventors: Martin F. Strassner, 9332 Brightwood Ct., Northridge, Calif. 91324; Mark S. Bochman, 15977 Crown Valley Rd., Poway, Calif. 92064

[21] Appl. No.: 09/088,453

[22] Filed: Jun. 1, 1998

Related U.S. Application Data

[63] Continuation-in-part of application No. 29/078,270, Oct. 22, 1997, Pat. No. Des. 413,031.

[51] Int. Cl.[7] .................................................. B60N 2/48
[52] U.S. Cl. ............................................................ 297/397
[58] Field of Search ................................. 297/391, 397; 5/636, 644, 645

[56] References Cited

U.S. PATENT DOCUMENTS

| | | | |
|---|---|---|---|
| 2,409,820 | 10/1946 | Zimmern | 5/645 X |
| 2,522,120 | 9/1950 | Kaskey et al. | 5/644 X |
| 3,017,221 | 1/1962 | Emery | 297/397 |
| 3,029,109 | 4/1962 | Nail | 297/462 X |
| 3,604,026 | 9/1971 | Scheips | 297/397 |
| 4,114,948 | 9/1978 | Perkey | 297/397 |
| 4,900,089 | 2/1990 | Alexander | 297/397 X |
| 4,967,429 | 11/1990 | Vlad | 297/397 X |
| 5,064,245 | 11/1991 | Stephens | 297/397 |
| 5,108,150 | 4/1992 | Stas et al. | 297/397 |

FOREIGN PATENT DOCUMENTS

| 2009792 | 11/1970 | Germany | 5/636 |
|---|---|---|---|

Primary Examiner—Peter R. Brown
Attorney, Agent, or Firm—Loeb & Loeb LLP

[57] ABSTRACT

A portable, compact, flexible and inflatable headrest for securing to one or two vehicle seats having a separately inflatable headrest section contoured for optimal head support and a separately inflatable base for inserting in the space between adjoining seats of a passenger vehicle or in the space between the top of a vehicle seat provided with an extendible seat head rest and the bottom of the extended seat head rest to optimize rest comfort for a passenger using the headrest.

14 Claims, 4 Drawing Sheets

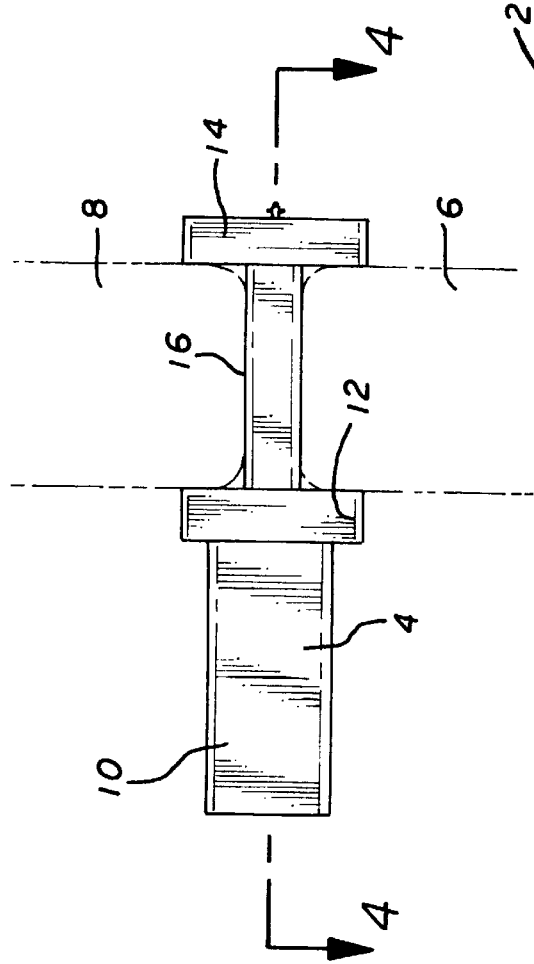
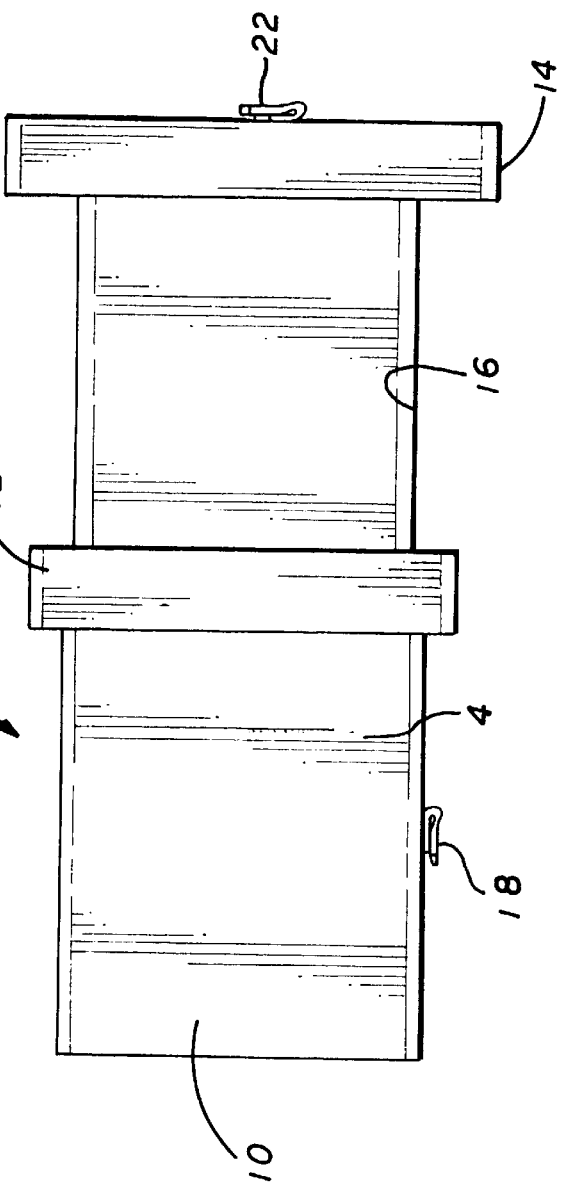

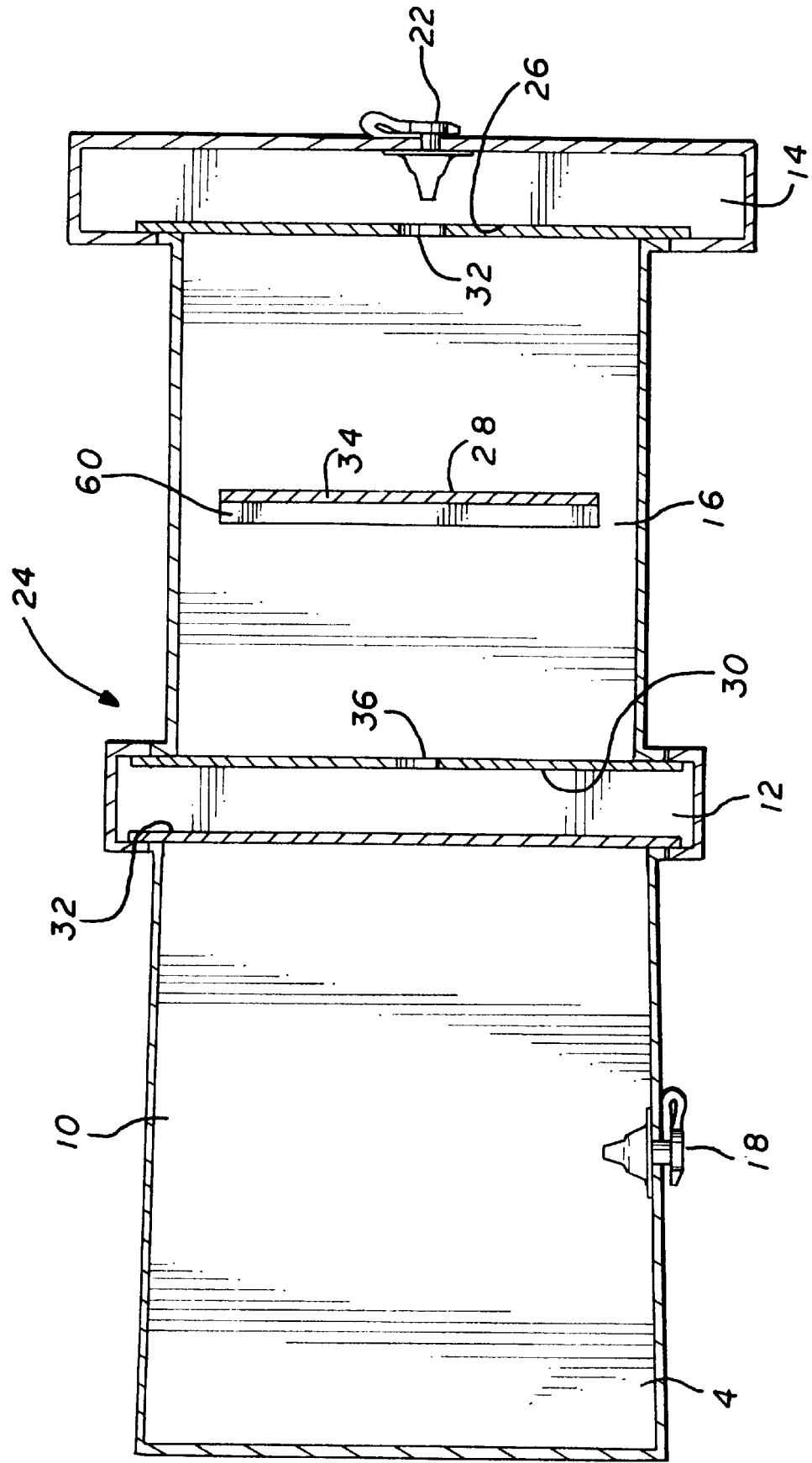

HEADREST

RELATED APPLICATION

This application is a continuation-in-part of United States design patent application Ser. No. 29/078,270, filed Oct. 22, 1997, issued as Design Pat. No. Des. 413,031 on Aug. 24, 1999 incorporated herein by reference.

BACKGROUND OF THE INVENTION

1. Field of the Invention

The present invention relates to a headrest for use by passengers in airplanes, trains, automobiles or other passenger vehicles.

2. Description of the Related Art

Pillows for use as a headrest by passengers in passenger vehicles, such as airplanes, are well known. The most popular pillow is an inflatable pillow in the shape of a horseshoe, which when inflated fits around a passenger's neck to support the passenger's head in a generally upright position while the passenger rests.

Other inflatable pillows in the shape of conventional pillows have also been used. Such pillows are employed by being placed against the interior of a passenger vehicle, such as against the bulkhead wall of an airplane, with the passenger's head resting against the pillow.

The known pillows, while acceptable for their purposes, are not specifically designed for use in passenger vehicles having adjoining seats, such as airplanes, or in automobiles with passenger seats having extendible head rests, are not adjustable or compact, and do not accommodate the manner in which many people sleep, namely, with the head resting to one side. The horseshoe-shaped pillow described above maintains a passenger's head in a generally upright position, but does not allow the passenger's head to rest to one side. The more conventionally shaped pillows, while permitting the passenger's head to rest to one side, do not stay fixed relative to the interior compartment of the vehicle and require the application of pressure from the head of the user to stay in place which is often uncomfortable and can disrupt a passenger's sleep. Conventional shaped pillows are heavy, not portable and not suitable for passengers seated in a seat away from the interior wall of the passenger compartment, such as a middle or aisle seat in an airplane.

Accordingly, there is a need for a compact, adjustable, flexible, easy to use, portable and light weight headrest that will permit a passenger's head to rest to one side while in use no matter where the passenger is sitting in the vehicle, and that will stay in a fixed position without the application of pressure to the pillow from the passenger's head to optimize head rest comfort for the user.

SUMMARY OF THE INVENTION

The present invention is directed to a compact, adjustable, flexible, easy to use and portable headrest for use in a space between adjoining seats of a passenger vehicle, or in conjunction with a passenger vehicle seat having an extendible head rest member that meets the above need. The headrest of the present invention has a head support section for supporting the head of a resting passenger and a base section adapted for insertion in the space between adjoining seats of a passenger vehicle, such as airplane, bus or train or, for passenger vehicles provided with passenger seats having extendible head rests, in the space between the passenger seat and the extendible head rest. The base section is configured so that the headrest of the present invention stays fixed in position when the base is inserted between adjoining seats or in the space between the seat top and the bottom of the extended head rest without requiring an application of pressure to the headrest by the passenger's head. Due to its portability and light weight, the inventive headrest may be carried in a standard briefcase or as a carry-on luggage on board a passenger vehicle such as airplane, bus, train or automobile. Once on board the vehicle a passenger simply inserts the headrest in the space between adjoining seats and adjusts the headrest position manually as necessary for the passenger's height, build and comfort before use. The inserted headrest is designed to stay fixed between two adjoining seats in a position selectable by the passenger. Since the headrest is fixed between adjoining seats, the headrest does not take any additional seat space and does not interfere with neighboring passengers. If the headrest is used in an automobile provided with passenger seats having extendible head rests, the user inserts the base in the space between the top of the passenger seat and the bottom of the extended head rest with the head support section sticking out over the front of the seat to support the head of the user. The user may manually adjust the angle of insertion of the base for optimal head rest comfort.

The headrest of the present invention may comprise a first and a second segment with a portion of the first segment having a larger cross sectional dimension than the second segment. Alternatively, the headrest of the present invention may comprise a first, a second and a third segment with a portion of the second segment having a larger cross sectional dimension than the first segment and the third segment having a smaller cross sectional dimension than the second segment.

The headrest of the present invention may also comprise a first, a second, a third and a fourth segment with a portion of the second segment having a larger cross sectional dimension than the first segment, the third segment having a smaller cross sectional dimension than the second segment, and a portion of the fourth segment having a larger cross sectional dimension than the third segment. In this case, the first segment is configured as a head support section for use by a passenger in a passenger vehicle and the second, third and fourth segments together form a base for securing the headrest to at least one passenger vehicle seat.

If the passenger vehicle seat is provided with an extendible seat head rest, the base may be adapted for inserting in the space between the top of the passenger vehicle seat and the bottom of the extended seat head rest to secure the headrest to the passenger vehicle seat. The second segment may serve as a front anchor for anchoring the base against the front surfaces of the seat and the extended seat head rest. The fourth segment may serve as a back anchor for anchoring the base against the back surfaces of the seat and the extended seat head rest and the third segment may serve as an intermediate section interconnecting the front anchor and the back anchor for inserting in the space between the top of the seat and the bottom of the extended seat head rest.

Additionally, the base may be adapted for inserting in the space between adjoining seats of a passenger vehicle with the second segment anchoring the base against the front surfaces of the adjoining seats, the fourth segment anchoring the base against the back surfaces of the adjoining seats and the third segment serving again as an intermediate section for inserting in the space between adjoining seats of the passenger vehicle.

In one embodiment of the present invention, the head support section and the base of the novel headrest may be inflatable as two separate air compartments to optimize head rest comfort for a passenger using the headrest. The inflatable base may include at least one interior baffle for providing structural stability and strength when the base is inflated and the interior baffle may be provided with at least one cutout for air flow regulation during inflation.

In another embodiment of the present invention, the base and the head support section may be made of solid and flexible material.

These and other embodiments of the present invention will become apparent from the following detailed description of the invention and accompanying drawings.

BRIEF DESCRIPTION OF THE DRAWINGS

FIG. 3 is a top plan view of FIG. 2 showing the headrest inserted between two adjoining seats shown in hidden line in accordance with the present invention;

FIG. 4 is a cross-sectional view along line 4—4 of FIG. 3 showing the interior structure of the headrest in accordance with the present invention; and FIG. 5 is a side elevational view of the headrest of FIG. 2 in accordance with the present invention.

DETAILED DESCRIPTION OF THE DRAWINGS

The following description includes the best mode presently contemplated for carrying out the invention. This description is not to be taken in a limiting sense, but is made merely for the purpose of describing the general principles of the invention. The scope of the invention should be determined with reference to the claims.

Figure 1:
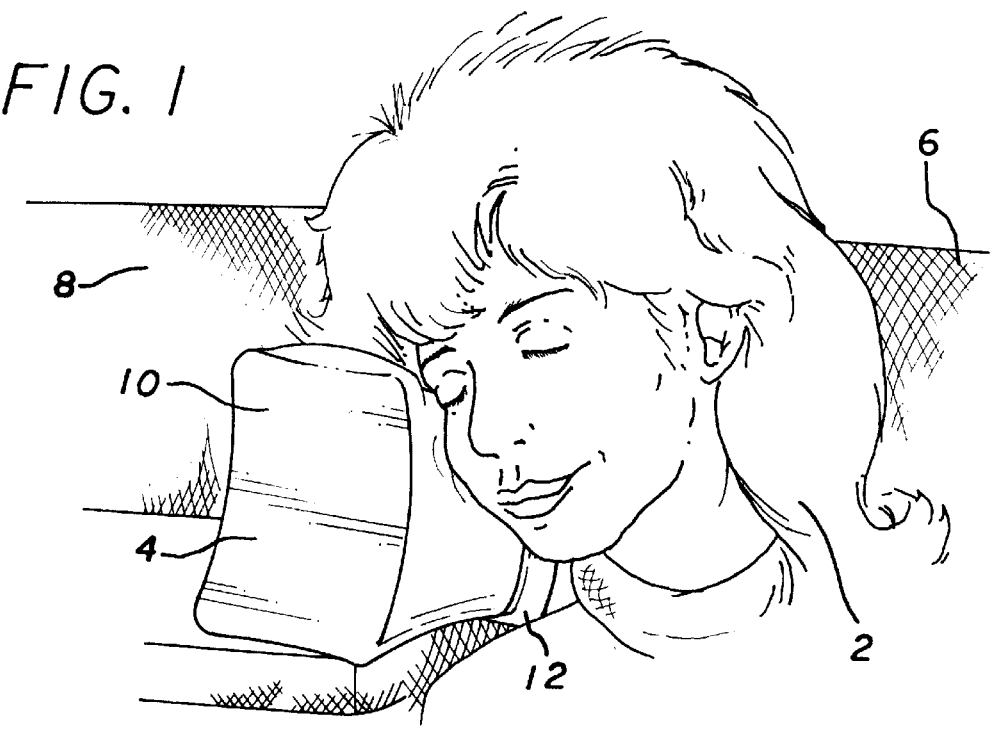
FIG. 1 is a front perspective view of a user's head resting to one side on a headrest of the present invention inserted between two adjoining seats of a passenger vehicle.

Referring to FIG. 1, a user 2 is shown using the headrest of the present invention generally referred to by reference numeral 4 with the headrest being firmly inserted between adjoining seats 6 and 8 in a passenger vehicle such as airplane, bus, train or the like. Headrest 4 is provided with a first segment or head support section 10 which protrudes outwardly from the front surfaces of adjoining seats 6 and 8 to provide support for a user's head. Head support section 10 is generally shaped like a parallelepiped having flexible and convex shaped walls so as to provide optimal head support for user 2 resting the side of her head against head support section 10.

Figure 1A:
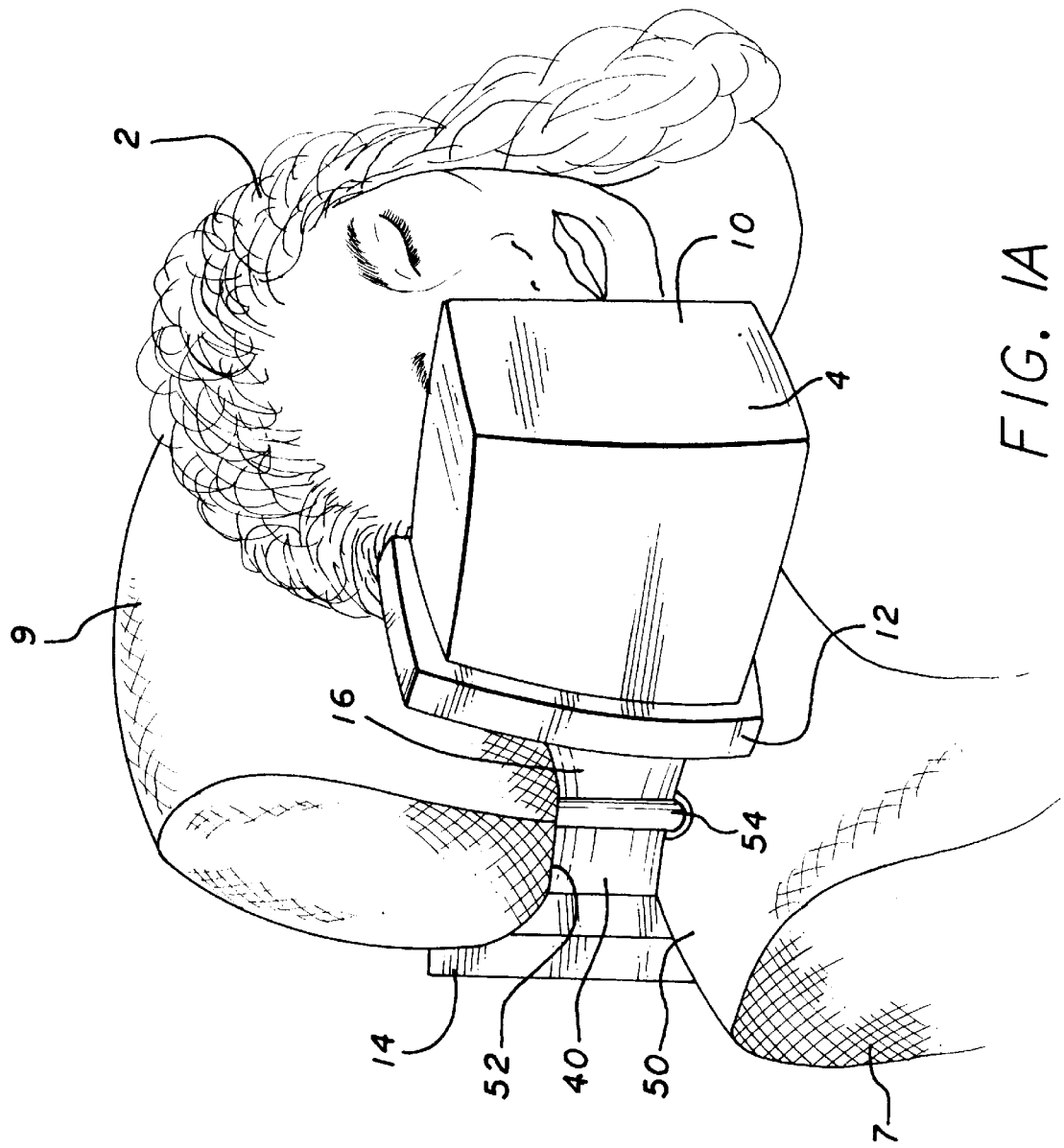
FIG. 1A is a front perspective view of a user's head resting to one side on a headrest of the present invention inserted in the space between the top of a seat provided with an extendible head rest and the bottom of the extended head rest.

Referring to FIG. 1A, a user 2 is shown alternatively using headrest 10 in conjunction with a vehicle seat 7 provided with an extendible head rest 9 shown in a raised position. Headrest 4 is provided additionally with a base 40 comprised of three segments and is shown securely inserted in the space between seat top 50 and bottom 52 of extended seat head rest 9. Base 40 is generally flexible and concave-shaped on all sides for easy insertion and has convex-shaped walls to enhance base stability when inserted.

Figure 2:
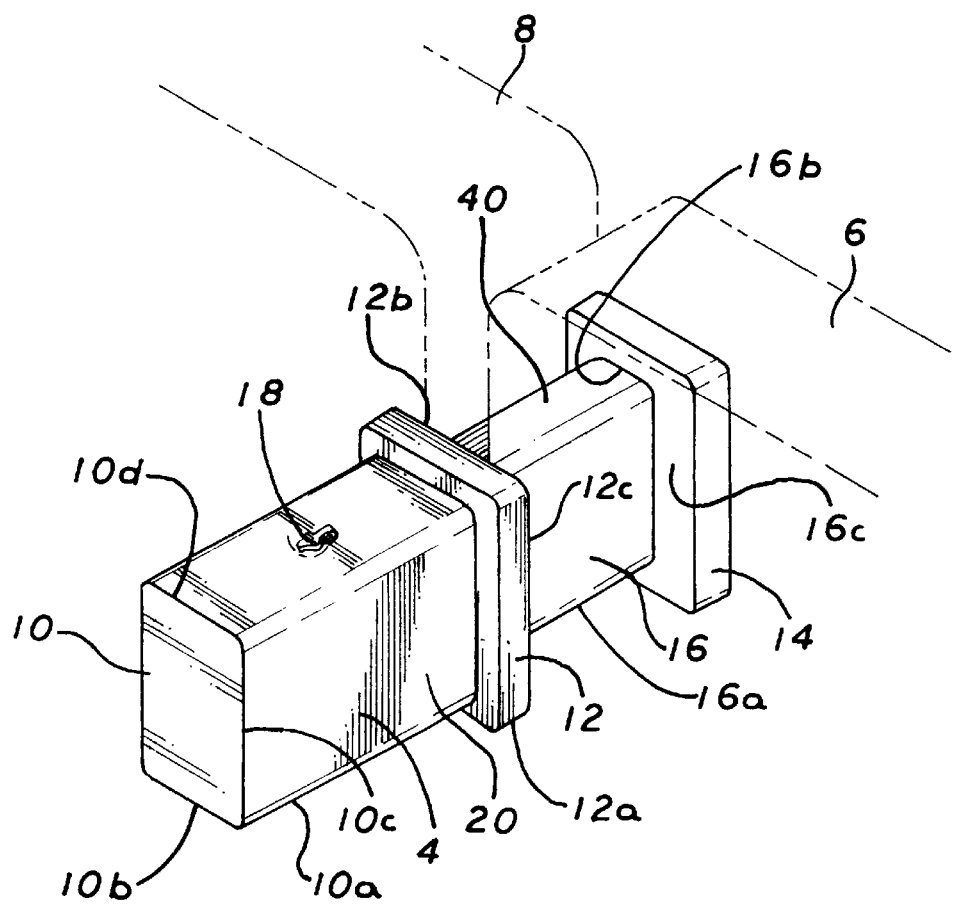
FIG. 2 is a front perspective view of the headrest of the present invention shown inserted between two adjoining seats shown in dotted line with the head support section inflated and protruding outward from the front surfaces of two adjoining seats.

Referring to FIG. 2, head rest 4 is shown inserted for support between adjoining seats 6 and 8 via base 40. Base 40 comprises a second segment or front anchor 12 for anchoring head support section 10 against the front surfaces of adjoining seats 6 and 8, a third segment or intermediate section 16 for insertion in the space between adjoining seats 6 and 8, and a fourth segment or back anchor 14 for anchoring the intermediate section against the back surfaces of adjoining seats 6 and 8.

Front anchor 12 is located near the back of head support 10 and due to its configuration is generally incapable of inserting in the space between seats 6, 8. Anchor 12 is shaped like a parallelepiped and has a larger cross sectional dimension than head support 10 which causes the anchor to protrude equally over head support 10 on all sides. When headrest 4 is in use, front anchor 12 presses against the front surfaces of adjoining seats 6, 8 and prevents headrest 4 from sliding toward the back surfaces of seats 6, 8 thereby anchoring headrest 4 firmly in the front.

Back anchor 14 is located at the back of headrest 4 and due to its configuration is generally incapable of inserting in the space between seats 6, 8. Anchor 14 generally matches in size, shape, cross sectional dimension and volume front anchor 12. When headrest 4 is in use, back anchor 12 presses against the back surfaces of adjoining seats 6, 8 and prevents headrest 4 from sliding toward the front surfaces of seats 6, 8 thereby anchoring headrest 4 firmly in the back.

Intermediate section 16 is shaped like a parallelepiped and has a smaller cross sectional dimension than front anchor 12, back anchor 14 and head support 10 to allow for insertion in the standard 3-inch spacing between adjoining airline seats 6 and 8.

The preferred approximate dimensions for head support 10 are: length 10a about 5 inches, lower width 10b about 2.25 inches, height 10c about 5 inches and upper width 10d about 3.25 inches (FIG. 2). The preferred size difference between the upper width and the lower width of head support 10 (not shown in FIG. 2) is designed to fit the natural curve of a passenger face resting on the head support thereby optimizing rest comfort for the user.

The preferred approximate dimensions for front anchor 12 are: length 12a about 3 inches, width 12b about 5 inches and height 12c about 6.50 inches (FIG. 2).

The preferred approximate dimensions for back anchor 14 preferably match the dimensions of front anchor 12 (FIG. 2) so as to allow equal support for intermediate section 16 on both sides when inserted.

The preferred approximate dimensions for intermediate section 16 are: length 16a about 4 inches, width 16b about 2 inches and height 16c about 5 inches. The 2 inch width of intermediate section 16 therefore allows for insertion of intermediate section 16 in the standard 3-inch spacing between airline adjoining seats.

The above dimensions and shape of headrest 4 are generally designed to fit current airline and passenger vehicle seat standards for vehicles provided with passengers seats having extendible head rests. It will be appreciated that other shapes and dimensions may be utilized to accommodate the variable height and build of users providing that they are suitable for the intended purpose of the present invention.

Headrest 4 as described above is preferably an inflatable headrest, however, the novel headrest may also be manufactured from a flexible solid material.

It will be appreciated that the overall dimensions and volume of the inflated headrest would be typically slightly larger than the dimensions and volume of the solid headrest depending on the amount of inflation desired by the user.

In the preferred embodiment of the present invention, as shown in FIGS. 2, 3, 4, and 5, headrest 4 is manufactured as an inflatable head support device from flexible PVC plastic or any other material suitable for the intended purpose of the inventive device. The inflatable head support device is generally made of two separate air compartments attached to each other via an internal wall for use in airplanes, trains, cars or any other place provided with adjoining seats which is suitable for practicing the present invention. One air compartment serves as head support 10 and the other air compartment serves as base 40 for securing the inventive headrest between adjoining seats 6 and 8.

More specifically, head support 10 is configured as a separately inflatable air compartment and provided with an air inlet valve 18, shown in FIGS. 2, 4 and 5, for inflation by the user either manually or with a portable air pump. Air valve 18 is designed to be pressed snugly into head support 10 after inflation so that it is flush with the outer wall surface of head support 10 to prevent accidental opening of the valve during use of the novel headrest. Head support 10 may also be provided on the outside with a soft cushion-like coating 20 as shown in FIG. 2 to increase friction between the outer wall surface of head support 10 and the face of a user thereby maximizing head rest support for the user. Coating 20 is also designed to prevent abrasion to a passenger's face as a result of shear forces.

Referring to FIG. 5, a second air compartment 24 is shown including anchor 12, anchor 14 and intermediate section 16. Air compartment 24 is inflated via an air inlet valve 22 (FIGS. 4 and 5). Air valve 22 is designed to be pressed snugly into the back surface of anchor 14 after inflation so that it is flush with the outer wall surface of back anchor 14 to prevent accidental opening of the valve during use of the headrest. The outside wall surface of air compartment 24 may also be provided with a coating (not shown) to increase friction between base 40 and the inner surfaces of adjoining seats 6 and 8 during insertion and to increase base stability during use of the headrest. To further increase the structural stability of the inventive head support device, several internal baffles or walls made of plastic or any other material suitable for the intended purpose of the inventive device are attached permanently inside the headrest as follows.

Referring to FIG. 4, baffle 26 separates internally the front of back anchor 14 and the back of intermediate section 16 and serves as an internal support wall for back anchor 14 and the back of intermediate section 16 when base 40 is inflated. Baffle 26 is provided with a circular cutout 32 which is designed to allow air flow between back anchor 14 and intermediate section 16 during inflation of second air compartment 24.

Baffle 28 (FIG. 4) is located inside and roughly in the middle of intermediate section 16 separating internally both sides of intermediate section 16 and providing structural rib wall support for intermediate section 16 when base 40 is inflated. Baffle 28 is provided with a circular cutout 34 which is designed to allow air flow between both sides of intermediate section 16 during inflation of second air compartment 24. Baffle 28 appears on the outside on both sides of intermediate section 16 as a pair of grooves such as groove 60 in FIG. 4.

Baffle 30 (FIG. 4) separates the front of intermediate section 16 and the back of front anchor 12 serving as an internal support wall for front anchor 12 and the front of intermediate section 16 when base 40 is inflated. Baffle 30 is provided with a circular cutout 36 which is designed to allow air flow between front anchor 12 and intermediate section 16 during inflation of second air compartment 24. When the user inflates second air compartment 24 via air inlet valve 22, air flows inside back anchor 14, intermediate section 16 and front anchor 12 with the aforementioned circular cutouts regulating internal air flow.

Baffle 32 (FIG. 4) is located internally between the front of front anchor 12 and the back of head support 10 and has no cutout so as to prevent air flow from second air compartment 24 to head rest 10 thereby separating internally both air compartments. Baffle 32 also serves as a common internal wall for head rest 10 and front anchor 12 providing internal structural support for both segments when the inventive head rest is inflated.

Alternatively, the novel headrest may be redesigned as a single air compartment inflatable headrest (not shown) with one or more air inlet valves. In such a set-up, baffle 32 would have to be provided with a cutout (not shown) to let air flow from front anchor 12 to head support 10 resulting in a single air compartment, one-piece inflatable headrest.

The above-described novel inflatable headrest is flexible, portable and may be carried by a passenger on board a vehicle inside a briefcase whether inflated or uninflated. If uninflated, a passenger may inflate the inventive headrest manually or by a portable air pump by inflating fully the head support section for optimal head support and then inflating the base to an appropriate fullness depending on the spacing between the adjoining seats of the vehicle. The passenger may then insert the inflated headrest snugly in the space between adjoining seats in preparation for use. If the vehicle adjoining seats are very close together or if there is any difficulty in inserting the inventive headrest between the seats, the passenger may let a portion of air out from the base in order to fit the base of the headrest in the space between adjoining seats. Alternatively, the passenger may tip one of the adjoining seats back to provide more space for inserting the headrest and then position the headrest between the seats after which the passenger may tip the seat forward to its original position thereby wedging the headrest firmly between the seats in preparation for use. The novel headrest is also easy to remove after use either by simply pulling it out of the space between the adjoining seats manually or, if that proves difficult, by deflating the headrest partially and then taking it out, or by tipping one of the adjoining seats back to free the headrest for removal.

As shown in FIG. 1A, headrest 4 in inflated or solid configuration may be used in conjunction with a vehicle seat provided with an extendible head rest such as seat head rest 9 which is supported on a couple of metal bars, such as bar 54, when extended upwards to support the head of a passenger. Such seats are usually found in automobiles. To use headrest 10 in this embodiment, base 40 is inserted in the space between top 50 of seat 7 and bottom 52 of extended seat head rest 9 such that front anchor 12 and back anchor 14 are left outside of the spacing with intermediate section 16 inserted inside the spacing. Front anchor 12 and head support section 10 hang over the front portion of the seat and serve as head support for user 2 as shown in FIG. 1A. During use, front anchor 12 pushes against the front surfaces of seat head rest 9 and seat top 50 and due to the concave shape of base 40 prevents slippage of the inventive headrest toward the back of the seat. Back anchor 14 respectively pushes against the back surfaces of seat head rest 9 and seat top 50 during use and due to the concave shape of base 40 prevents slippage of the inventive headrest toward the front of the seat. Before inserting base 40 seat head rest 9 is raised to a degree that would allow easy insertion of base 40 which is dimensioned to fit in the spacing between seat top 50 and seat head rest bottom 52. Once intermediate section 16 is inserted, the user manually lowers seat head rest 9 until bottom 52 pushes against the top of intermediate section 16. Since base 40 is a flexible mass whether made of solid material or inflated with air, the user continues to push down until intermediate section 16 is tightly secured inside the spacing and seat head rest 9 snaps into one of the predetermined height notches on each metal bar supporting seat head rest 9.

The angle of insertion may be manually adjusted by the user to provide optimal rest comfort for the user. In adjusting the angle of insertion and depending on the height and build of the user, intermediate section 16 may be pushed all the way to the side when inserted to allow maximum space for resting the side of the user's head against head support 10 and the back of the user's head against a portion of front anchor 12 and a portion of seat head rest 9. The user may choose the side that is most comfortable for rest. When intermediate section 16 is pushed all the way to one side, the inserted intermediate section 16 is being supported inside the spacing not only by seat top 50 and seat head rest bottom 52 but also by one of the metal bars (not shown in FIG. 1A) which supports seat head rest 9 in an extended position. Such an arrangement provide additional support for the inserted intermediate section 16.

Headrest 4 as described above may also be manufactured from flexible polyurethane foam covered by a plastic cover (not shown) or any other material suitable for the intended purpose of the inventive device as a compact, easy to use and portable head support device for use in airplanes, trains, cars, automobiles or any other place suitable for the intended purpose of the present invention. The cover may be permanently sewn after the foam is inserted or alternatively, the cover may be provided with a zipper, button or velcro-type closure or the like for easy maintenance of the headrest. The foam may be one or more pieces designed for use in the headrest according to the present invention. Headrest 4 may also be provided on the outside with a soft coating to increase friction between the surface of head support 4 and the face of a user and to prevent abrasion to a passenger's face as a result of shear forces.

The inventive headrest whether solid or inflated is compact, easier to use than conventional travel pillows and provides a more natural sleeping or resting position for the user in an airplane, train, bus, automobile or as a head rest in general.

While the invention herein has been described by means of specific embodiments, numerous modifications and variations could be made thereto by those skilled in the art without departing from the scope of the invention set forth in the claims.

What is claimed is:

1. A headrest for supporting at least a portion of the lateral aspect of the face and head of a person seated in a passenger seat of a vehicle said headrest being removably inserted into a space between a first seat and a second passenger seat adjacent to said first seat said seats having front and back surfaces, said headrest comprising:

a first segment for contacting and supporting at least a portion of the lateral aspect of a person's face and head, a second segment extending from said first segment, said second segment snugly inserted at least in part into the space between the first and second passenger seats; and a third segment extending from said second segment having a cross-sectional dimension larger than said second segment, said third segment having first and second edges; said first edge in contact with the back surface of said first passenger seat, and said second edge in contact with the back surface of said second passenger seat; such that said first and second edges are anchored to the back surfaces of said first and second passenger seats to tightly hold the headrest in between said first and second passenger seats;

whereby said first segment protrudes outwardly from between the first and second passenger seats to provide support for at least a portion of the lateral aspect of the head and face of a person seated in said first passenger seat.

2. The headrest of claim 1, wherein at least a portion of said second segment has a smaller cross sectional dimension than the largest cross sectional dimension of said first segment.

3. The headrest of claim 1, further comprising at least a fourth segment positioned in between said first and said second segments, at least a portion of said fourth segment having a larger cross sectional dimension than said second segment wherein said difference in size between said second and fourth segments' cross sections forms at least two edges for anchoring against the front surfaces of said first and second passenger seats.

4. The headrest of claim 3, wherein the first passenger seat includes an extendible rest for supporting the back of a person's head and said second segment may be inserted into a second space between the top of the first passenger seat and the bottom of the extendible rest, wherein said first and second edges of said third segment are in contact with the back surfaces of said first passenger seat and said extendible rest to secure said headrest to the passenger seat.

5. The headrest of claim 4, wherein said fourth segment serves as a front anchor for anchoring said headrest against the front surface of the first passenger seat.

6. The headrest of claim 4, wherein said second segment serves as an intermediate section interconnecting said fourth and said third segments.

7. The headrest of claim 1, wherein said second segment may be inserted into the space between a passenger seat and a sidewall of a passenger vehicle.

8. The headrest of claim 1, wherein said first segment is inflatable as a separate air compartment from said second segment to optimize comfort for a passenger using said headrest, said first segment including at least one air inlet valve for inflating said head support section.

9. The headrest of claim 1, wherein said second segment is inflatable as a separate air compartment, said second segment including at least one air inlet valve for inflating said second segment.

10. The headrest of claim 9, wherein said second segment includes at least one interior baffle for providing structural stability and strength when said second segment is inflated.

11. The headrest of claim 10, wherein said interior baffle has at least one cutout for air flow regulation during inflation.

12. The headrest of claim 1, wherein said first and second segments are solid and flexible.

13. The headrest of claim 1, wherein said first segment has concave-shaped walls for enhancing comfort.

14. A headrest for supporting at least a portion of the lateral aspect of the face and head of a person, said headrest being detachably attached to a passenger seat with an extendible rest, said headrest comprising:

a first elongated segment for contacting and supporting at least a portion of the lateral aspect of a person's face and head;

a second elongated segment extending from said first segment, said second segment configured to snugly fit into a space available between the top of the passenger seat and the bottom of the extendible rest to firmly mount the headrest to the passenger seat, a third segment extending from said second segment having a cross-sectional dimension larger than said second segment, said third segment having first and second edges; said first edge in contact with the back surface of the passenger seat, and said second edge in contact with the back surface the extendible rest, such that said first and second edges are anchored to the back surfaces of the passenger seat and the extendible rest to tightly hold the headrest in between the top of the passenger seat and the bottom of the extendible rest;

a fourth segment positioned in between said first and said second segments having a cross-sectional dimension larger than said second segment; said difference in size between said second and fourth segments' cross sections forming edges for anchoring against the front surfaces of said and passenger seat and said extendible rest;

whereby said first segment protrudes outwardly from between the top of the passenger seat and the bottom of the extendible rest to provide support for at least a portion of the lateral aspect of the head and face of a person seated in one of the two adjacent passenger seats.

\* \* \* \* \*